United States Patent [19]

McMahon

[11] Patent Number: 4,736,360

[45] Date of Patent: Apr. 5, 1988

[54] BULK OPTIC ECHELON MULTI/DEMULTIPLEXER

[75] Inventor: Donald H. McMahon, Carlisle, Mass.

[73] Assignee: Polaroid Corporation, Cambridge, Mass.

[21] Appl. No.: 887,710

[22] Filed: Jul. 21, 1986

[51] Int. Cl.[4] ............................................. H04B 9/00
[52] U.S. Cl. ...................................... 370/3; 350/96.19
[58] Field of Search .............. 370/3; 350/96.15, 96.16, 350/96.18, 96.19; 356/354

[56] References Cited

U.S. PATENT DOCUMENTS

| | | | |
|---|---|---|---|
| 3,863,063 | 1/1975 | Indig et al. | 250/199 |
| 4,449,782 | 5/1984 | Korth | 350/96.16 |
| 4,634,215 | 1/1987 | Reule | 350/96.16 |
| 4,634,219 | 1/1987 | Suzuki | 350/162.22 |

OTHER PUBLICATIONS

Koonen et al.–"Optical Devices for WDM"–Philips Telecommunication Rev., vol. 40 #2, Jul. 1982, pp. 102–110.
Tomlinson et al.–"Optical WD Multiplexer"–Electronics Letters–25 May 1978, vol. 14 #11, pp. 345–347.
Fuji et al.,–"Optical Demultiplexer"–IEEE Jour. Quantum Electronics, vol. QE16 No. 2, Feb. 1980, pp. 165–169.
Silicon Micromechanical Devices, J. B. Angell, S. C. Terry and P. W. Barth, Scientific American, Apr. 1983, vol. 248, No. 4, pp. 44–55.

Primary Examiner—Joseph A. Orsino, Jr.
Attorney, Agent, or Firm—Francis J. Caufield

[57] ABSTRACT

Bulk optic echelon gratings suitable for use in multi-/demultiplexing optical signals carried on sets of optical fibers. The gratings can be either reflective or transmissive and may be either curved with self-focusing properties or planar requiring the use of auxiliary collimating optics. All versions have the property of being simultaneously blazed at at least two different wavelengths whose ratio is in the range between 0.8 and 0.9. This property of the gratings enables their operation over preferred multiple wavelength bands using a limited set of fibers which are fixed in place. Preferred wavelengths at which the gratings are simultaneously blazed include 1.3 and 1.55 micrometers. Devices incorporating the gratings can be used singly or in groups in inverted tree arrangements for tandem or hierarchical multiplexing purposes.

28 Claims, 4 Drawing Sheets

BULK OPTIC ECHELON MULTI/DEMULTIPLEXER

BACKGROUND OF THE INVENTION

This invention in general relates to optical communications and in particular to bulk optic echelon multiplexers.

Wavelength division multiplexing (WDM), the simultaneous transmission of several signals on a single path, is a technology that is fundamentally important in fiber based communications systems because of its impact on system configuration, performance, and cost. One major advantage of this technology is its ability to increase system capacity by increasing the number of channels that can be carried per fiber. With increased capacity, fiber requirements and associated fiber costs decrease, and already installed systems can more easily be upgraded to handle subsequent increases in traffic. Additionally, different modulation schemes can be used on assignable channels to enhance flexibility and overall system design.

Wavelength selective devices for multi/demultiplexing may be classified in a variety of categories according to physical properties and function and include such things as multiwavelength sources or detectors, dielectric filters, and angularly dispersive devices like prisms and gratings. As evidenced by the literature, high resolution line and Fresnel gratings have been proposed and used. However, their fabrication requires submicron precision, since the line periodicity required for adequate resolution is of the order of a wavelength, and the accuracy for good quality, low noise gratings must be considerably better than one wavelength of light. Consequently, it is relatively difficult to exploit conventional photolithographic integrated optics fabrication technology to manufacture line gratings to the precision required for WDM applications.

Gratings with periodicities larger than the normal line grating are also known and have been proposed for use as optical spectrometers and fiber optic multiplexers. These include the echelon, echelle, and echelette. Typically, their use for such applications has been that of replacing simple low order diffraction gratings.

Echelon gratings were first proposed by Michelson as a means for creating a blazed grating with very high wavelength dispersion. One should note that the dispersion of an echelon grating is no different than that of a normal grating used at the same angle of light incidence. Normal gratings, however, exhibit a low diffraction efficiency when used at a high order of diffraction. By contrast, an echelon grating can diffract theoretically up to 100% of incident light into a single diffraction order.

The ability to manufacture reasonable quality echelon gratings has not existed until the recent introduction of ruling equipment that uses coherent light in a feedback loop to control the position of the ruling machine to an accuracy much more precise than one wavelength of light. The actual machining is accomplished using a small, precisely formed diamond tool. Typically, the positional accuracy allows the light level of ghosts to be 1,000 to 10,000 times lower than that of the principal blazed diffraction beam. However, the lack of exactly flat tools for machining promotes the diffraction of light into orders other than the desired blazed order, and therefore typically reduces the efficiency for blazed diffraction to less than 50%.

Known commercially available echelon gratings are blazed to operate at an angle of 63° or more from normal incidence as a means for increasing the wavelength dispersion. In many cases, operation at such high angles of incidence implies that the width of a facet (perpendicular to the grating lines) of the grating is not large compared to a wavelength of light. Moreover, with machined gratings, each facet is likely to be irregularly non-flat with the result that the effective width of the flat may be even smaller than if calculated using the total step width. Under these circumstances, the electrical resistivity of metalized surfaces at optical frequencies, in the direction in which current flow is restricted, produces a decreased reflectivity for light polarized in that direction. Conversely, since there is essentially no geometric current restriction along the lines of the grating, the reflectivity for light polarized in that direction is unchanged with respect to a flat mirror. The net result is that echelon gratings are often manufactured so as to exhibit an inherent sensivitity to the state of polarization of an incident light beam.

The fiber optics telecommunications market is focused on two specific optical bands centered on 1.30 and 1.55 microns because these bands correspond to the lowest loss wavelength range for fused silica fiber. Because there is a large amount of fiber installed in the ground which operates at 1.30 microns, the wavelength of lowest dispersion in typical single mode fiber, and because the lowest fiber loss is not at 1.55 microns, there is a great deal of uncertainty as to which band will become preeminent for long haul and short haul telecommunication transmission. Moreover, there is a concensus of opinion that the fiber installed for use at 1.30 microns will be useable at 1.55 microns if narrow line laser sources (distributed feedbak lasers) are used as transmitters since then the higher dispersion at 1.55 microns would no longer limit the bandwidth-length transmission distance. Fiber optic systems designers consequently would like to be able to hedge on system design by using components that will operate at either 1.30 or 1.55 microns or at both wavelengths simultaneously.

In view of the foregoing, it is a primary object of the present invention to provide a bulk optic echelon grating suitable for use in optical communications systems for multi/demultiplexing purposes.

It is another object of the present invention to provide an easily fabricated multi/demultiplexing device for use in optical communications.

Yet another object of this invention is to provide an echelon multi/demultiplexer that simultaneously operates at a number of different wavelengths at the same position in the focal plane.

Other objects of the invention will, in part, be obvious and will, in part, appear hereinafter when the detailed description to follow has been read.

SUMMARY OF THE INVENTION

This invention generally relates to optical communication systems and particularly to the structure and use of bulk optic echelon gratings in devices for multi-/demultiplexing optical signals carried on sets of fixed optical fibers.

The gratings themselves are preferably fabricated using photolithographic and preferential etching techniques. With these techniques, steps of predetermined width and height are formed in substrates which may be either curved or planar. The curved substrates have self-focusing properties, while the planar need to be used with auxiliary collimating optics. Both reflective and transmissive gratings are possible, but the reflective types are preferred for highest efficiency and dispersion.

All versions of the gratings have the property of being simultaneously blazed at at least two different wavelengths whose ratio is in the range between 0.8 and 0.9. Accordingly, the gratings can be operated over multiple wavelength bands using a limited set of optical fibers fixed in place, preferably in a fan-out arrangement to facilitate coupling.

Preferred wavelengths at which the gratings are simultaneously blazed include 1.3 and 1.55 micrometers, two wavelengths of importance in optical communication because of their correspondance with the low loss region of silicate fibers.

An algorithmic procedure is described for designing the echelon grating steps to achieve simultaneous blazing, i.e., 100% diffraction efficiency, at preferred wavelengths. This basically involves determining the step height into which preferred wavelengths evenly divide.

Insensitivity to the state of polarization of optical signals incident on the gratings is achieved by assuring that the grating step width is sufficiently large compared with the operating wavelengths of the gratings.

The gratings are incorporated in multi/demultiplexing devices along with fiber fan-outs which include the trunk line and other fibers on each side of it. The self-focusing property or the auxiliary optics are used to receive and direct signals to the appropriate fiber locations in the focal plane.

The preferred wavelength ratio for blazed operation is substantially 0.84 and preferred step heights are 7.75 and 15.5 micrometers.

Combinations of devices in inverted tree arrangements are illustrated for isolating the blazed as well as adjacent wavelengths.

DESCRIPTION OF THE DRAWINGS

The novel features that are considered characteristic of the invention are set forth with particularity in the appended claims. The invention, itself, however, both as to its organization and method of operation and fabrication, together with other objects and advantages thereof, will best be understood from the following detailed description of the illustrated embodiments and fabrication methods when read in connection with the accompanying drawings wherein like numbers have been employed in the different figures to denote the same parts and wherein:

FIGS. 4a-4e are diagrammatic graphs illustrating how the response of typical echelon gratings of the invention repeats at selected preferred wavelengths, N and NH;

DETAILED DESCRIPTION

This invention generally relates to optical communications and particularly to the use of bulk echelon gratings in devices for multi/demultiplexing signals in the optical regions of the spectrum. A number of devices incorporating bulk echelon gratings will be shown and described. These differ in the number of parts used, the details of their focusing arrangements and perhaps in method of fabrication, but otherwise are alike in principle and operation. Among the properties that are common to all of them are:

(1) high substantially equal throughput coupling efficiency for both light polarization states;
(2) usefulness with a fixed and limited number of fibers over a wide range of wavelengths;
(3) operation at the blaze angle for a multiple number of preselected discrete wavelengths of light;
(4) capability for multistage or hierarchical multiplexing network architectures;
(5) usefulness in different optical bands thereby reducing manufacturing inventory requirements;
(6) inherent insensitivity to temperature; and
(7) reasonable cost.

Although reflective echelon gratings are preferred for use in the devices for their achromatization and higher resolution properties, it should be kept in mind that transmissive type also can be usefully employed. The devices preferably are fabricated to handle 20 to 50 channels separated by as little as 1 Angstrom, fine channel resolution, and as much as 10 Angstroms, which is considered coarse. In describing the devices, their overall structures will first be presented and then this will be followed by a discussion of the details of their shared echelon grating properties, design considerations, and techniques useful in their fabrication.

Figure 1:
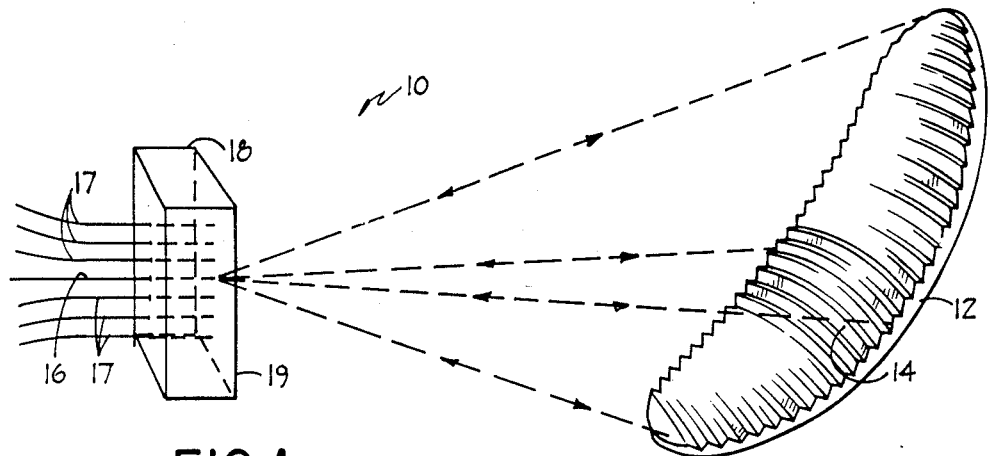
FIG. 1 is a diagrammatic perspective view of a preferred echelon multi/demultiplexer incorporating both echelon and focusing functions in one part.

FIG. 1 shows a reflection device 10 which is a preferred embodiment that minimizes parts and cost by combining focusing and dispersion action in a curved echelon. In this case, the echelon surface is curved into a "tipped spherical" surface 12 which consists of a linear arrangement of all widths (W) which subtend the same angle with respect to the focal point reflecting facets 14, all of which are segments of spherical surfaces concentric with the end of a central fiber 16 which is part of a fiber optic fan-out chip 18. Each facet 14 is separated from the next by a fixed, equal radial distance. Since all facets 14 are spherical surfaces, light originating at the center of fan-out 18 is "reflected back", i.e., defracted, to that point because the step height, H, the radial distance between facets, is made evenly divisible by an exact multiple number of wavelengths of light, as will be more fully explained hereinafter. However, any wavelength which does not evenly divide into the step height, H, is diffracted (i.e., reflected back) at a slightly different angle. The difference in angle as a function of wavelength is summarized by the formula $$d\theta = (2H/W) d\lambda/\lambda$$

where W is the (step) width of a facet, H, again, is the increase in radial distance between facets (step height), $d\theta$ is the change in angular direction, and $d\lambda/\lambda$ is the fractional change in light wavelength. If the focal length of the echelon mirror 12 is F, then the change in angle $d\theta$ results in a displacement in the focal plane 19 equal to $$dS = F \, d\theta.$$

Thus, dS represents the distance by which adjacent fiber cores need to be separated on either side of central fiber 16 to receive or transmit signals. These other fibers are designated generally at 17. In operation, central fiber 16 acts as the trunk carrying multiplexed signals at different wavelengths and these are separated for travel along the other fibers 17 and vice versa.

Since the focusing is accomplished via a reflecting element, the spherical echelon multiplexer is perfectly achromatic. As previously mentioned, the use of the bulk optic echelon provides low sensitivity to the state of light polarization when the step width, W, is large compared to the operating wavelength. In essence, the spherical echelon multiplexer represents the simplest and lowest cost approach.

Figure 2:
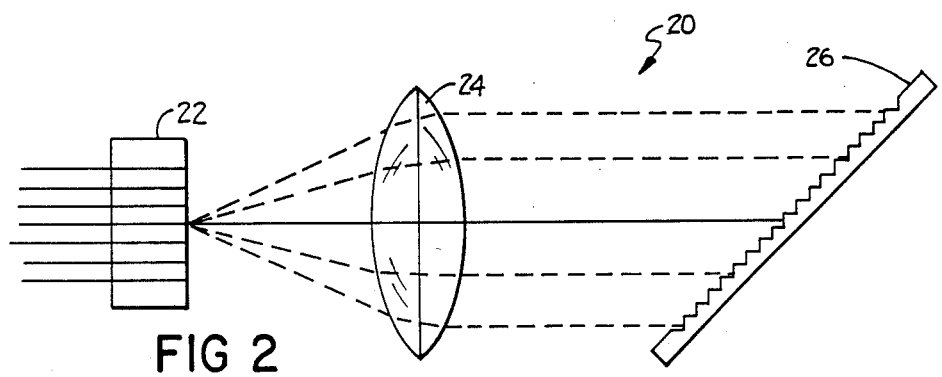
FIG. 2 is a diagrammatic elevation of an alternate embodiment of the invention wherein the echelon and focusing functions are carried by separate parts.

The second structural type of bulk optic echelon multiplexer, designated in FIG. 2 as 20, contains three components: a fiber fan-out 22, a collimating lens 24, and a planar echelon grating 26. Planar echelon grating 26 can be prepared either by machining techniques or by preferential etching of silicon. Collimating lens 24 is preferably an achromatic doublet which minimizes all optical aberrations, including change in focal length, with wavelength of light. This structure is also polarization insensitive and represents, by virtue of a single fan-out for light input and output and a single lens for collimating and focusing, the next lowest cost device approach.

One fabricated version of device 20 used a preferentially etched grating with a surface periodicity of 24.7 microns, resulting in a step height of 20.1674 microns at the blaze angle of 54.7356 degrees from normal incidence. With a focusing lens having a focal length of 5.0 cm, and a 186.6 micron fiber-to-fiber spacing in the fan-out (the focal plane of the lens), the channel-to-channel separation is 2.0 nm. The principal concern with these types of structure is chromatic aberration produced by the lens, so care must be taken to reduce chromatic effects.

Figure 3:
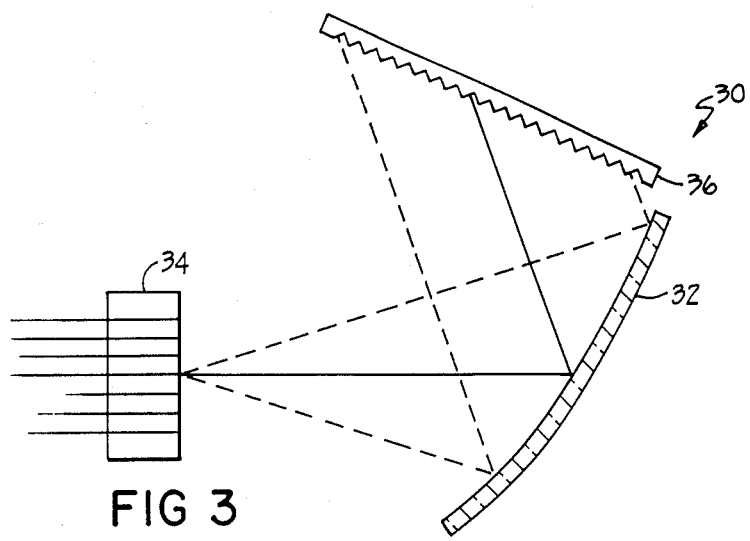
FIG. 3 is a diagrammatic elevation view, partially in section, of another alternate embodiment of the invention using a planar echelon in conjunction with an off-axis paraboloidal reflector.

The device of FIG. 3, designated by numeral 30, is a modification of the previous structure in that the chromatic glass lens is replaced by a paraboloidal offaxis reflecting collimator 32 which accepts light from a fiber fan-out 34 and directs it to an echelon grating 36 in a reversible manner. In this case, since the light is reflected back onto itself, a relatively compact structure results. The principal advantage of this approach with respect to FIG. 2 is the elimination of chromatic aberration.

In the foregoing examples of fiber optic echelon multiplexers, the echelon gratings are designed so as to provide highly efficient transfer of light at a multiplicity of selected wavelength bands. For example, note that the ratio 1.55/1.30 microns is closely equal to 6/5. Therefore, an echelon grating that is blazed for operation at the 6th order of 1.30 microns can be simultaneously operated under blazed conditions at 1.55 microns on the 5th order. Let us assume an echelon grating with a step height difference in reflection of 7.75 microns. Then this echelon is simultaneously blazed for 1.55 and 1.292 microns. The grating is also blazed at 1.107, 0.969, 0.861, 0.775 microns for the 7th, 8th, 9th and 10th diffraction orders respectively, and blazed at 7.75, 8.875, 2.583 and 1.937 microns for the 1st, 2nd, 3rd, and 4th orders, respectively.

Consider another example, a multiplexer using a grating having a periodicity of 24.7 microns created on a wafer of silicon. In this case, the step height differential is 40.3349 microns and all wavelengths which satisfy the formula (40.3349)/N, where N is an interger, will be diffracted at the same blaze angle, an angle of 54.7356 degrees from the normal direction of the wafer. In this case, the grating is blazed for operation at 1.55134 microns on the 26th order, for 1.30112 microns on the 31st order as well as 0.79088 on the 51st order and 1.06144 on the 38th order. These first two wavelengths correspond again to the fiber optic telecommunications bands. The 3rd wavelength closely matches the wavelength of inexpensive (compact disc player) lasers and the 4th closely matches the wavelength available from neodymium glass lasers. It is thus clear that a judicious choice of echelon step height allows one to create an optical multiplexer which can be used at any one of these four bands centered on these blazed wavelengths (or many others as well). The same fiber connections can then be used equally well simultaneously in all of these four bands to multiplex light of predefined wavelengths.

Figure 4:
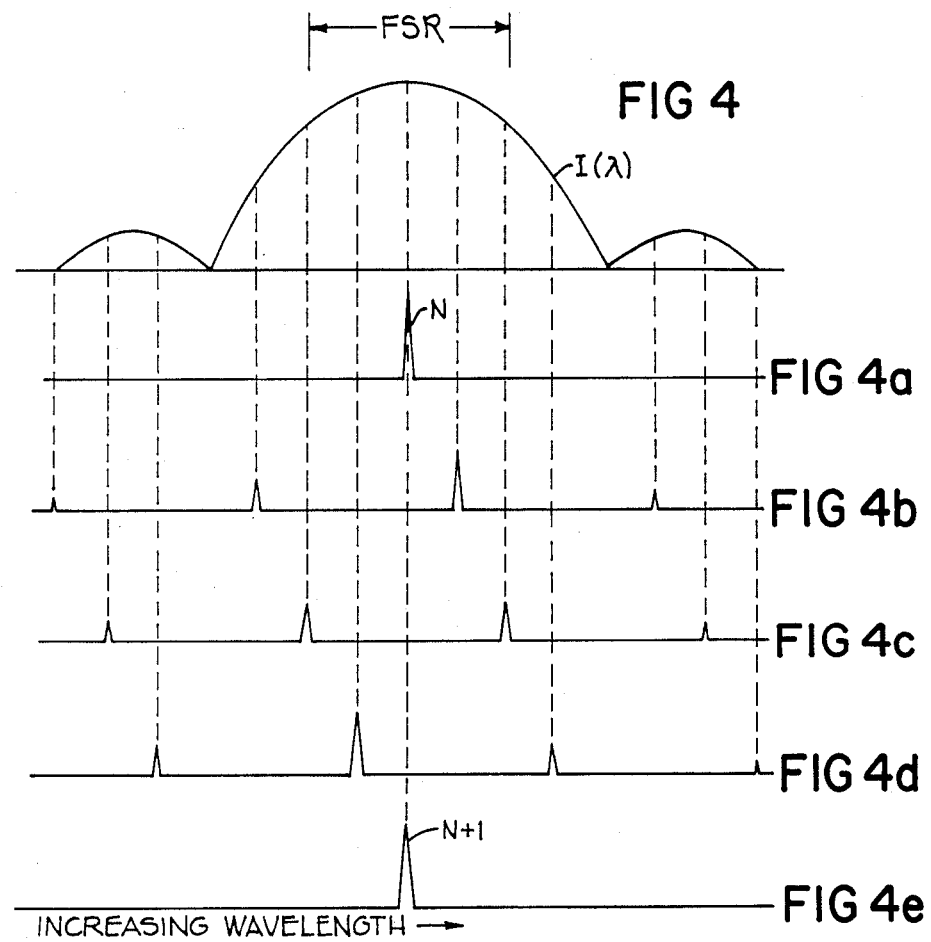
FIG. 4 is a diagrammatic graph illustrating the envelope response of a typical echelon grating of the invention.

Light which is reflected by the echelon grating at exactly the blaze angle can theoretically be diffracted with an efficiency of 100%. Light reflected at other angles has a reduced efficiency. For an echelon grating that has perfectly flat, equally spaced reflecting facets and illuminated with a uniformly intense beam of width W, the efficiency of diffracted light can be shown to follow an envelope $$I(\lambda) = \text{sinc}^2[(N - 2H/\lambda)\pi]$$

where $\theta$ changes by $(\pi)$ radians for a light wavelength change corresponding to one order of diffraction as shown in FIG. 4, where with N=the order of diffraction, $$N\lambda - 2H/W = \sin\theta, \text{ for small } \theta.$$

It will be recognized that the $I(\lambda)$ function has unity (100%) efficiency for light propagating at the blaze angle $\theta = 0$. Any additional orders of light of that same wavelength will travel in directions such that $\theta = \pm N(\pi)$ which correspond to nulls in the formula response. The envelope response is in fact significant only for $-(\pi) < \theta < (\pi)$, which can be generally referred to as the range over which blazed diffraction occurs. Hence, for wavelengths of light not diffracted exactly at the blaze angle, most of the diffracted light will appear as two significant orders, both of which lie within the blaze angle range. The light power appearing in these two orders ranges from being equal when both orders are equally displaced from the exact blaze angle to very unequal when one order approaches the blaze angle and the remaining order approaches the adjacent null in the envelope response. From these considerations, one concludes that the efficiency for light diffraction into a single order will range from a theoretical maximum of 100% (at the exact blaze angle) to 50% for light diffracted at an angle halfway between the blaze angle and the adjacent null in the envelope response. In particular, as the wavelength of light increases, one sees a shift in the light direction for a single order (N) of diffraction from the blaze angle toward higher angles with the appearance of a second strong order of diffraction (N+1) that moves from the lower angle null signal direction toward the blaze angle as the first order (N) moves toward the higher angle null signal direction as shown by FIGS. 4a–4e.

Since the two diffraction orders that fall within the blaze range carry a large fraction of the total diffracted light power, one can sum the power of these two orders to obtain a fairly accurate estimate of the diffraction efficiency of the echelon grating. Generally, either because of non-flat facets or because of ruling irregularities, the diffraction efficiency does not achieve the theoretical efficiency of 100%, but rather is more of the order of 50%. Under these conditions for the multiplexer working between $-\pi/2 < \theta < \pi/2$ (a full diffraction order), the worst case of diffraction efficiency for light going into a single order is 25%. For many applications, a −6dB loss (i.e. 25%) cannot be tolerated. There are basically two ways to decrease loss: (1) operate at close to the exact blaze angle, and (2) improve the quality of the echelon grating so that the blazed operation efficiency is close to 100%. Through proper mechanical design of an echelon multiplexer structure, one can via method #1 achieve efficiencies nearly equal to blazed operation for the range of wavelengths used by the multiplexer. By proper fabrication procedures, e.g., preferential etching of silicon, explained later, the latter condition, i.e., higher diffraction efficiency in a single order, can be achieved. By combining both principles in the same device, one can achieve a fiber optic multiplexer design that exhibits low loss, and an optical throughput that approaches greater than 50% in efficiency.

A generalized procedure for determining echelon step heights for simultaneous blazing at two arbitrary wavelengths is to find the interger fractional best fit to the two wavelengths, $\lambda_1/\lambda_2 = f < 1$, and then:

(1) pick n such that n is an integer and as small as possible such that $1/n < f$;
(2) add increments of unity to the denominator and numerator until the total of increment m satisfies the relationship $m + 1/m + n > f$; and
(3) If $m + 1/m + n$ or $m/m + n - 1$ are not sufficiently good matches, then add 1 to denominator to get $m + 1/m + n + 1 < f$.

Go to step (2) and repeat procedures (2) an (3) until a best fit is found that satisfies the required, free spectral range (see FIG. 4), i.e., if FSR is a minimum value for $\lambda_1$, then $$\frac{FSR(\lambda_1)}{\lambda_1} > \frac{1}{\text{numerator integer}} ; \frac{FSR(\lambda_2)}{\lambda_2} > \frac{1}{\text{Denominator integer}}$$

As an example, take the ratio $\lambda_1/\lambda_2 = 1.30/1.55 = 0.8387096 = f$, which is worked out in the following table:

| Identified Close Fits | | FSR at $\lambda_1$ (1.55μ) | at $\lambda_2$ (1.30μ) |
|---|---|---|---|
| | 1/2 = .5 | | |
| | 2/3 = .67 | increment both numerator and denominator | |
| | 3/4 = .75 | | |
| | 4/5 = .80 | | |
| (1) | 5/6 = .8333 | 3100 Ang | 2167 Ang |
| | 6/7 = .857 | 1st fraction > f | |
| | 6/8 = .750 | add 1 to denom. | |
| | 7/9 = .778 | | |
| | 8/10 = .800 | | |
| | 9/11 = .8182 | | |
| (2) | 10/12 = .8333 | 1550 Ang | 1083 Ang |
| | 11/13 = .8461 | | |
| | 11/14 = .7857 | add 1 to denom. | |
| | 12/15 = .8000 | | |
| | 13/16 = .8125 | | |
| | 14/17 = .8235 | | |
| (3) | 15/18 = .8333 | 1033 Ang | 722 Ang |
| (4) | 16/19 = .8421 | 969 Ang | 684 Ang |
| | 16/20 = .8000 | add 1 to denom. | |
| | 17/21 = .8095 | | |
| | 18/22 = .8181 | | |

-continued

| Identified Close Fits | | FSR at $\lambda_1$ (1.55μ) | at $\lambda_2$ (1.30μ) |
|---|---|---|---|
| 19/23 = .8260 | | | |
| (5) 20/24 = .8333 | | 775 Ang | 542 Ang |
| (6) 21/25 = .84 | | 738 Ang | 520 Ang |
| 21/26 = .8077 | add 1 to denom. | | |
| 22/27 = .8148 | | | |
| 23/28 = .8214 | | | |
| 24/29 = .8276 | | | |
| (7) 25/30 = .8333 | | 620 Ang | 433 Ang |
| (8) 26/31 = .8387096 | | 596 Ang | 419 Ang |
| 26/32 | | | |
| 27/33 | add 1 to demom. | | |
| 28/34 | | | |
| 29/35 | | | |
| (9) 30/36 = .8333 | | 516 Ang | 361 Ang |
| (10) 31/37 = .83784 | | 500 Ang | 351 Ang |
| 32/38 = .8421 | | | |
| 32/39 = .8205 | add 1 to denom. | | |
| 33/40 = .8250 | | | |
| 34/41 = .8292 | | | |
| (11) 35/42 = .8333 | | 443 Ang | 309 Ang |
| (12) 36/43 = .8372 | | 430 Ang | 302 Ang |
| 37/44 = .8409 | | | |
| 37/45 = .8222 | add 1 to denom. | | |
| 38/46 = .8260 | | | |
| 39/47 = .8298 | | | |
| (13) 40/48 = .8333 | | | |
| (14) 41/49 = .8367 | | | |
| (15) 42/50 = .8400 | | 369 Ang | 250 Ang |
| 42/51 = .8235 | add 1 to denom. | | |
| etc. | | | |

Suppose that one wanted to have 32 channels spaced 20 Angstroms for a total range of 640 Angstroms at 1.55 microns, then the best solution is (6) for ratio of 21/25=0.84. If one also required an FSR of 640 at 1.3, then solution (3) 15/18 is most optimal.

If one wishes an echelon that is simultaneously blazed for more than two wavelengths, one makes up a table similar to the above for the second set of two wavelengths and looks for "common" matches. For example, suppose the 3rd wavelength is 1.06 m, then 1.06/1.55=0.68387.

| | | |
|---|---|---|
| 1/2 = .5000 | 15/22 = .6818 | 29/42 = .6905 |
| 2/3 = .6667 | 16/23 = .6956 | 29/43 = .6744 |
| 3/4 = .7500 | 16/24 = .6667 | 30/44 = .6818 |
| 3/5 = .6000 | 17/25 = .6800 | 31/45 = .6888 |
| 4/6 = .6667 | 18/26 = .6923 | 31/46 = .6739 |
| 5/7 = .7142 | 18/27 = .6667 | 32/47 = .6808 |
| 5/8 = .6250 | 19/28 = .6551 | 33/48 = .6875 |
| 6/9 = .6667 | 20/29 = .6896 | 33/49 = .6734 |
| 7/10 = .7000 | 20/30 = .6667 | 34/50 = .6800 |
| 7/11 = .6363 | 20/31 = .6452 | 35/51 = .6862 |
| 8/12 = .6666 | 21/32 = .6562 | 35/52 = .6731 |
| 9/13 = .6923 | 22/33 = .6667 | 36/53 = .6792 |
| 9/14 = .6428 | 23/34 = .6764 | 37/54 = .6851 |
| 10/15 = .6666 | 24/35 = .6857 | 37/55 = .6727 |
| 11/16 = .6875 | 25/36 = .6944 | 38/56 = .6785 |
| 11/17 = .6471 | 25/37 = .6756 | 39/57 = .6842 |
| 12/18 = .6667 | 26/38 = .6842 | 40/58 = .6896 |
| 13/19 = .6842 | 26/39 = .6500 | 40/59 = .6779 |
| 13/20 = .6500 | 27/40 = .6750 | 41/60 = .6833 |
| 14/21 = .6667 | 28/41 = .6829 | |

The 13/16/19 ratio for 1.06, 1.30, 1.55 appears to be the best math.

The preferred step height is such that the gratings are simultaneously blazed at at least two preferred wavelengths whose ratio is within the range 0.8 to 0.9. Especially preferred wavelengths whose ratio (0.8387) is within this range are 1.3 and 1.55 micrometers.

Figure 5:
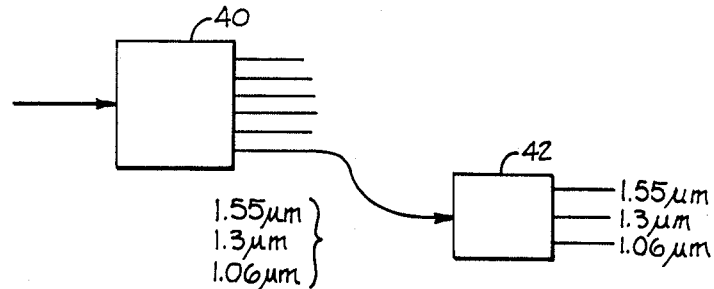
FIG. 5 is a diagrammatic illustration showing how a number of devices according to the invention can be arranged in inverted tree fashion to isolate signals operating at preferred wavelengths.

If an echelon multiplexer is operated simultaneously in several orders (wavelength bands), it is clear that light from widely separated orders can readily be separated by standard interference filters. It is also possible to use two echelon multiplexers in succession to achieve sequential filtering of several wavelengths as shown diagrammatically in FIG. 5 where a pair of echelon grating structures 40 and 42 are cascaded. In contrast with interference filters, each echelon filtering stage can demultiplex signals into many different paths rather than only two. That is, the 1.06, 1.3 and 1.55 light that exits via the same fiber of a first multiplexer (40) can readily be separated by a second multiplexer (42) into the component wavelengths. Consequently, multistage use of echelon multiplexers allows one to impliment a hierarchical multiplexed system structure.

In fabricating the echelon grating structures used in the devices of the present invention, use may be made of precision machining techniques and indeed, where curved surfaces are involved, will be the preferred fabrication technique. However, where planar or slightly curved surfaces need to be fabricated, it is preferred to use photolithographic techniques and preferential etching.

The technique of preferential etching of silicon is well known and is summarized in "Silicon Micromechanical Devices" by James B. Angell, Stephen C. Terry and Phillip W. Barth, Scientific American, April, 1983. The use of photolithographic techniques to fabricate complex patterned micro-structures is also well known and is the basis for VLSI integrated circuit technology. Standard photolithography is, however, not capable of the submicron accuracies necessary for preparing masks for standard diffraction gratings which are to be used in first or low order. Nevertheless, the equipment and techniques for preparing photolithographic masks are sufficiently accurate to fabricate large area (e.g., 1″ by 1″) light diffracting echelon gratings that are essentially "ghost" free, and such masks used in conjunction with preferential etched silicon fabrication procedures allow one to construct blazed echelon gratings from these mask patterns, gratings that operate to diffract light which reasonably approximates the maximum theoretical resolution and efficiency. The use of properly oriented silicon substrates allows one to control the ratio of step height (H) to width (W) of the echelon grating, thereby allowing the dispersion of the grating to be controlled. Higher dispersions can be created in this way than are available through the use of standard first order (holographic) diffraction gratings.

First consider the photolithographic mask preparation step. Equipment typically used to prepare masks have specified absolute positional accuracies of 10 millionths of an inch or 2.5 microns. However, the accuracy needed to prepare echelon grating masks is about 1 millionth of an inch which produces a dimensional error in reflection of 0.05 microns or a phase shift of 5% at 1 micron wavelength. By preparing actual echelon photolithographic masks, it has been found that the actual absolute positional error of the equipment is often much closer to the required 1 millionth of an inch rather than the equipment specifications of 10 millionths of an inch.

Echelon grating masks have been prepared using a "flash generator" which exposes the mask through a mechanically movable rectangular aperture of controllable dimensions. The grating pattern consists in this case of a set of parallel lines 5 microns in width spaced 25 microns apart. The pattern covered a 2 cm by 2 cm area. The mask was checked by inserting it into an expanded He-Ne laser beam (633 nm). Light diffracted at approximately 90° by the grating was focused to a minimal spot size. It should be appreciated that a grating spacing of 25 microns produces many orders of diffraction each separated by an angle of 0.025 radians (at 0.633 nm) and that the 56th order of diffraction is viewed when observing the diffracted light at 90°. Note that to observe diffraction at 90° the mask must be tilted at 45° with respect to the input laser beam and that the light reflected off the mask travels in a direction opposite to that of the diffracted light.

The focal spots produced by the mask in 56th order were of high quality with no discernable halo or scattering between orders observable. These results indicated that the mask pattern was of sufficient accuracy to produce high quality echelon gratings if the subsequent preferential etching of silicon processing likewise adhered faithfully to the mask pattern.

The next processing step is to use the mask to produce preferentially etched grooves in silicon. This procedure is well covered by the Scientific American Article, supra, and will not be further described here.

Figure 6:
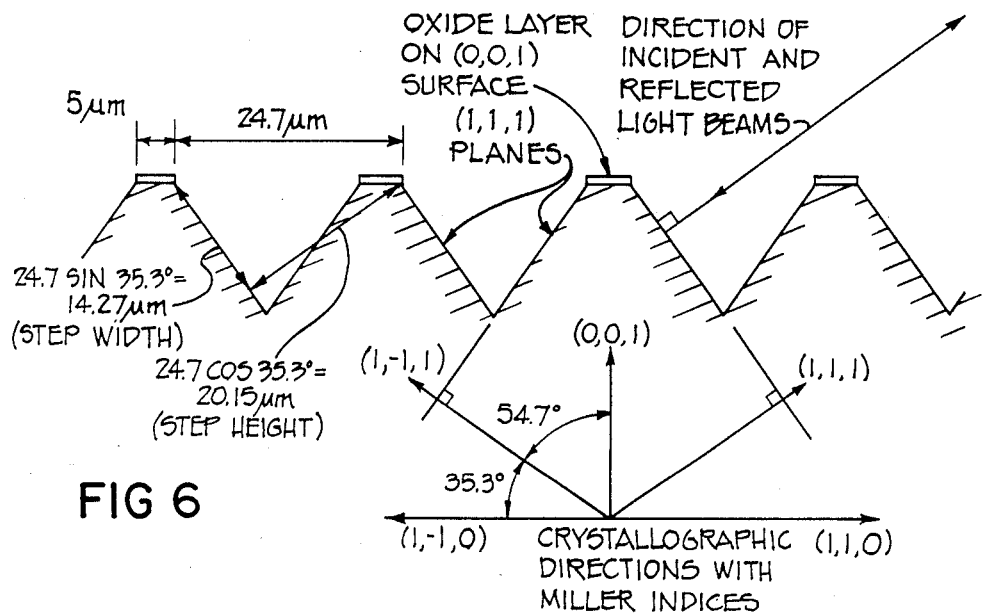
FIG. 6 is a diagrammatic illustration showing the crystallographic orientation for creating an embodiment of the invention using preferential etching of silicon.

FIG. 6 shows a cross-sectional diagram of an etched silicon grating with respect to the principal crystallographic directions (Miller indices). The original surface portions remaining after etching are the 5 micron wide (100) faces that were covered by a silicon dioxide layer and hence not attacked by the etch (ethylenediamine). The surfaces created by the preferential etch are normal to the (111) Miller direction. The (111) direction lies 54.7° from the (001) axis toward the (110) direction. The (111) faces form grooves parallel to the (110) direction.

To complete the echelon grating, the remaining oxide layer is removed and a thin metal layer is evaporated onto the grooved surface to provide high reflectance over a wide range of optical and near infrared wavelengths. Although both silver and copper provide high reflectivity (98.5%) over the spectrum from 0.7 to 10 microns, gold is preferred due to its resistance to oxidation.

Light is incident upon the echelon grating at close to normal incidence to one of the sets of (111) faces. The light is therefore specularly reflected from the faces of the grooves, and hence the grating is said to be operated at its blaze angle, i.e., $N\lambda - 2H = 0$, $\sin\theta = 0$, $\theta = (N\lambda - 2H/W)$ $\theta = 0$, i.e., "blazed".

Gratings operated under the blazed condition diffract light with high efficiency as previously indicated. The inherent value of the preferential etching procedure is both that the needed relative positional accuracies of the grooves is inherently produced, and that the groove faces represent flat surfaces that are aligned accurately with respect to the same (111) surfaces. The net result is that preferential etching of silicon produces wellblazed echelon diffration gratings.

With light incident upon this echelon example at normal incidence to one of the sets of (111) faces, the 25 micron surface periodicity increases the path distance by $25 \cos(35.3) = 20.4$ microns per step. For light reflected substantially back onto itself (which is the intended echelon use), the increase in light propagation distance per step is 40.8 microns for a total of 64.4, 51.0 and 31.3 wavelengths of light at 0.633, 0.8 and 1.3 microns, respectively. For completeness, note that the step width in FIG. 6 is $25 \sin(35.5) = 14.45$ microns so that the ratio of step width to step height is 1.41.

Gratings of the type and dimensions shown in FIG. 6 have been fabricated. These gratings were tested at 0.633, 0.8 and 1.3 micron wavelength (i.e., in 64th, 51st and 31st order, respectively). One can calculate that the free spectral range (FSR), i.e., the wavelength change per diffraction order (see FIGS. 4-4e) is 9.9 nm, 15.7 nm, and 42 nm at each of these wavelengths, respectively. The change in diffraction angle per order can likewise be calculated and is 0.0156, 0.0196 and 0.0322 radians, respectively, at the three indicated wavelengths.

With an effective spot diameter of 1 cm, the theoretical angular resolution of this echelon ($d\theta = \lambda/D$ with D the diameter of the beam and $\lambda$ the wavelength of light) is 0.63E-4, 0.8E-4 and 1.3E-4 radians, respectively, at each of the three wavelengths, respectively. Combining this result with the change in angle per free spectral range, one calculates that the theoretical number of resolution spots is equal to 245 per FSR and is independent of wavelength. Experimental measurements made at all three wavelengths indicate an experimental ratio of FSR to full width at half height of a diffraction spot to be about 150, a value which is in excellent agreement with the above calculations based on the Rayleigh resolution criterion.

The fabricated grating diffracted 49%, 55% and 50% of incident light into diffraction limited spots at 0.633, 0.8 and 1.3 microns, respectively. Of the remaining light fraction, approximately 20% (5 microns flat top/25 microns total groove periodicity) is specularly reflected from the plane of the echelon and is known to be wasted. This flat top light wastage can be reduced either by reducing the opaque strips in the photolithographic mask or by overetching to increase the etch depth into the (111) direction (etching in that direction is about 30 times slower).

The remaining light is spread out along the entire span between two orders (over the angular range of the blaze of the grating) and represents a greatly reduced light intensity to an output designed to be small enough to efficiently pick up light at a single wavelength. One grating made exhibited a 1E-3 background level between principal diffraction orders.

It is important to reduce this background light level for two reasons: (1) to improve the light throughput of an echelon grating used as a wavelength multiplexer/demultiplexer, and (2) to reduce the crosstalk between channels. For example, suppose that a multiplexer has 100 input light channels of equal strength and the amount of light per input (because of the background) leaks into an unselected channel is one part in a thousand. Then the desired signal to undesired crosstalk level will be about 10 which is marginal for low error digital data channels and may well be inadequate for analog reception.

Figure 7:
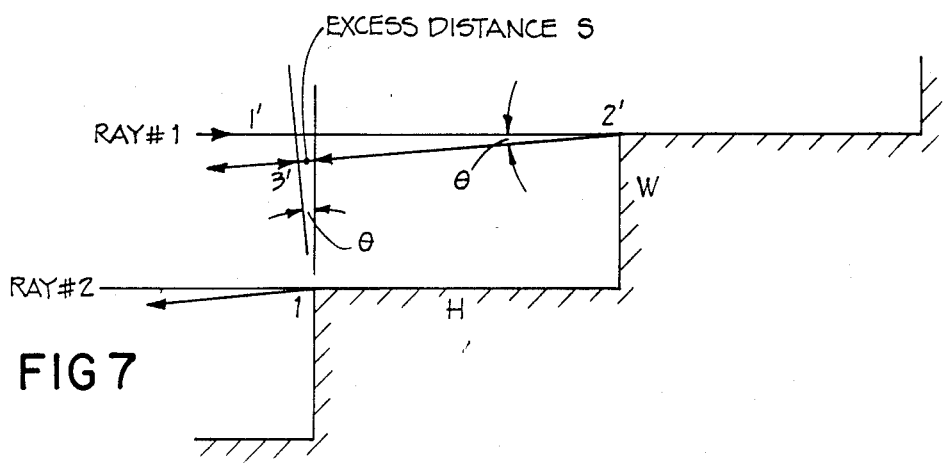
FIGS. 7 and 8 are illustrations useful in understanding the theoretical basis of operation of gratings according to the invention.

Let us now consider the echelon grating structure in more detail and calculate the wavelength dispersion as a function of step width to step height ratio. Consider, as shown in FIG. 7, a light of wavelength $\theta$ which has a reflected diffraction maximum at an angle $\theta$ with respect to normal incidence with respect to the "height" H portion of the surface of the echelon. Here again, the width of the step is denoted by W. Since light ray #1 is reflected at point 1, light ray #2 must contain a integer N number of wavelengths over the path 1', 2', 3'. Then, the excess distance S along path 2 is given by $$N\lambda - 2H = S \text{ with } S << W$$

But also, $$S/H = \sin\theta,$$

so that combining the two equations gives:

$$(N\lambda - 2H)/W = \sin\theta.$$

Differentiation then yields $$Nd\lambda = Wd\theta$$

or since $N\lambda = 2H$, $$d\theta = (2H/W)(d\lambda/\lambda).$$

It is therefore clear that the angular dispersion of an echelon grating is proportional to twice the step height to step width ratio and therefore that higher discrimination in wavelength will result with an increase in this ratio.

Figure 8:
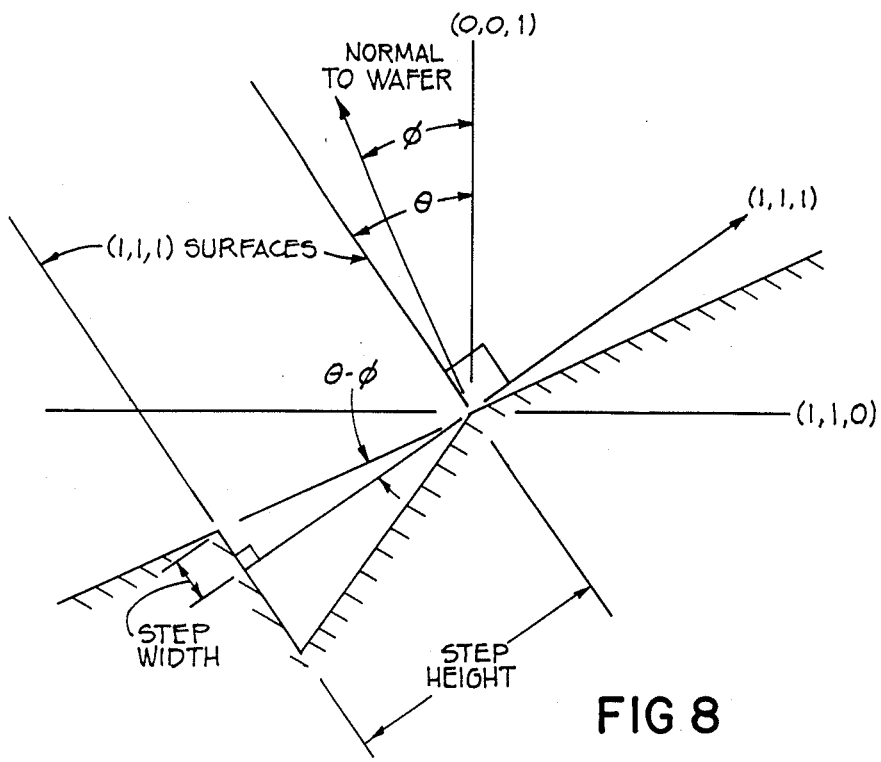

Thus, it is important to indicate how one can modify the preferential etch procedure to produce arbitrary step width/height ratios. The solution is to cut the silicon wafers at an angle so that the normal surface is canted from the (100) direction toward the (110) direction. FIG. 8 shows for simplicity of illustration a single step of a canted echelon grating. Studying FIG. 8 readily shows that:

$$\text{step width/step height} = W/H = \tan(\theta - \phi)$$

However, $\theta$, which is the angle between the (110) and (111) direction is, of course, well-known to be 35.3° (i.e., $\sin\theta = 1/\sqrt{}$). Thus, to produce a predetermined step height-to-width ratio one solves this formula for $\phi$. Specifically, $$\phi = \theta - \tan^{-1}(W/H).$$

For example, if H/W=5, then $\phi=24°$. Also, if H/W=10, then $\phi=29.6°$.

Figure 9:
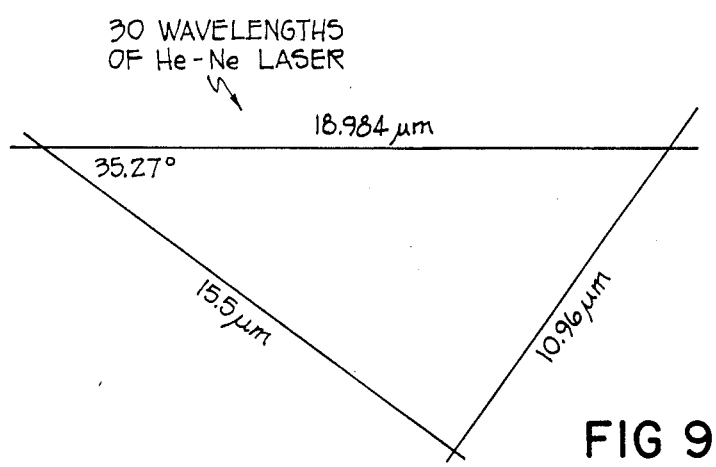
FIG. 9 illustrates a geometry for use as the step in a preferred grating according to the invention.

One preferred groove geometry which can be fabricated using the foregoing techniques is shown in FIG. 9 where the blaze angle is 54.73° and the step height is 15.5 micrometers. This particular geometry is of interest because it is simultaneously blazed at 1.55, 1.29, 1.068, 0.837, 0.795 and 0.632 micrometers, all wavelengths of extreme importance to the optical communications industry. This geometry is also of particular interest because it can be readily fabricated using machine procedures since the surface periodicity is exactly equal to 30 wavelengths of He-Ne laser at 0.6328 micrometers.

In summary, high quality echelon diffraction gratings can be fabricated using photolithographic techniques in combination with preferential etching of silicon. The echelon gratings so made are highly blazed and highly efficient and they exhibit diffraction limited resolution. The echelon gratings so made also diffract light of both polarization states with substantially equal efficiency and produce an angle of diffraction which is insensitive to temperature variation. Given these desirable properties, there is now every reason to believe that such echelon gratings will be useful as the light dispersing element of fiber optic wavelength division multiplexers.

It will be obvious to those skilled in the art that other changes may be made in the above-described embodiments without departing from the scope of the invention. Therefore, it is intended that all matter contained in the above description or shown in the accompanying drawing shall be interpreted as illustrative and not in a limiting sense.

What is claimed is:

1. A bulk optic echelon grating for use in multi-/demultiplexing signals in the optical region of the spectrum, said echelon comprising a plurality of steps of predetermined width and height where said height is such that said grating is simultaneously blazed at at least two wavelengths whose ratio is within the range from 0.8 to 0.9.

2. The bulk optic echelon grating of claim 1 wherein said ratio of said blazed wavelengths is substantially equal to 0.8387.

3. The bulk optic echelon grating of claim 1 wherein said height of said steps is substantially equal to 15.5 micrometers.

4. The bulk optic echelon grating of claim 1 wherein said height of said steps is substantially equal to 7.75 micrometers.

5. The bulk optic echelon grating of claim 1 wherein said steps thereof are formed in a planar substrate.

6. The bulk optic echelon grating of claim 1 wherein said steps are reflective to achromatize said grating.

7. The bulk optic echelon grating of claim 6 wherein said reflective steps are each segments of concentric spheres so that optical signals at said blazed wavelengths originating at the center of curvature of said concentric spherical segments are focused back on said center of curvature after reflection from said grating.

8. The bulk optic echelon grating of claim 1 wherein said width of said steps is such that the operation of said grating is insensitive to the state of polarization of incident light.

9. A bulk optic echelon grating for use in optical fiber based communication systems to multi/demultiplex optical signals of differnent wavelengths between a fixed set of fibers, said grating comprising a pluraity of steps of predetermined width and height where said height is such that said grating multi/demultiplexes at at least two wavelength bands over the position of said fixed set of fibers where said wavelength bands are separated in wavelength by less than an octave.

10. A bulk optic echelon grating for use in multi/demultiplexing signals in the optical region of the spectrum, said echelon comprising a plurality of steps of predetermined width and height where said height is such that said grating is substantially blazed simultaneously at at least two wavelengths which substantially divide evenly into said step height and are separated in wavelength by less than an octave.

11. The bulk optic echelon grating of claim 10 wherein said two wavelengths include 1.30 and 1.55 micrometers.

12. A bulk optic device for use in optical fiber based communication systems to multi/demultiplex optical signals of different wavelengths, said device comprising:
a finite set of optical fibers fixed in place aside of one another and all aimed generally in the same direction; and
a bulk optic echelon grating fixed in place facing said set of fibers to receive optical signal(s) emerging from at least one of said fibers and diffract said signal(s) into at least one other of said fibers, said grating comprising a plurality of steps of predetermined width and height where said height is such that said grating is substantially blazed simultaneously at at least two wavelengths including 1.30 and 1.55 micrometers.

13. The bulk optic device of claim 12 where said grating height is selected from the heights including 7.75 or 15.5 micrometers.

14. A bulk optic device for use in optical fiber based communication systems to multi/demultiplex optical signals of different wavelengths, said device comprising:
a finite set of optical fibers fixed in place aside of one another and all generally aimed in the same direction; and
a bulk optic echelong grating fixed in place facing said set of optical fibers to receive optical signal(s) emerging from at least one of said fibers and diffract said signal(s) into at least one other of said fibers, said grating comprising a plurality of steps of predetermined width and height where said height is such that said grating is substantially blazed simultaneously at at least two wavelengths which divide substantially evenly into said step height and are separated in wavelength by less than an octave.

15. A bulk optic device for use in optical fiber based communication systems to multi/demultiplex optical signals of different wavelengths between optical fibers, said device comprising:
at least one optical fiber fixed in place along its optical axis and structured and arranged to propagate a plurality of optical signals of different wavelengths; and
a bulk optic echelon grating fixed along said optical axis to receive optical signals emerging from said optical fiber, and diffract them in different angular directions as a function of the wavelength of said optical signals, said grating comprising a plurality of steps of predetermined width and height where said height is such that said grating is simultaneously blazed at at least two wavelengths whose ratio is within the range from 0.8 to 0.9.

16. The bulk optic device of claim 15 wherein said ratio of said blazed wavelengths is substantially equal to 0.8387.

17. The bulk optic device of claim 15 wherein said height of said steps is substantially equal to 15.5 micrometers.

18. The bulk optic device of claim 15 wherein said height of said steps is substantially equal to 7.75 micrometers.

19. The bulk optic device of claim 15 wherein said steps of said grating are formed in a planar substrate.

20. The bulk optic device of claim 15 wherein said steps of said grating are reflective to achromatize said grating.

21. The bulk optic device of claim 20 wherein said reflective steps are each segments of spheres concentric with said optical fiber so that optical signals at said blazed wavelengths originating from said optical fiber are focused back into said optical fiber after reflection from said grating.

22. The bulk optic device of claim 15 wherein said width of said steps is such that the operation of said grating is insensitive to the state of polarization of incident optical signals.

23. The bulk optic device of claim 15 further comprising a lens between said optical fiber and said bulk optic echelon grating to collimate signals emerging from said optical fiber.

24. The bulk optic device of claim 23 wherein said steps of said bulk optic echelon grating are reflective and wherein said lens focuses light reflected from said steps.

25. A bulk optic device for use in optical fiber based communication systems to multi/demultiplex optical signals of different wavelengths, said device comprising:
a set of optical fibers fixed in place aside of one another and all aimed generally in the same direction; and
a bulk optic echelon grating fixed in place facing said fibers to receive optical signal(s) emerging from at least one of said fibers and diffract said signal(s) into at least one other of said fibers, said grating comprising a plurality of steps of predetermined width and height where said height is such that said grating multi/demultiplexes at least two wavelength bands among said fixed set of fibers where said two wavelength bands are separated in wavelength by less than an octave.

26. A multistage multi/demultiplexing device for use in optical fiber based communications systems, said device comprising:
at least one optical fiber fixed in place along its optical axis and structured and arranged to propagate a plurality of optical signals of different wavelengths;
a bulk optic echelon grating fixed along said optical axis to receive optical signals emerging from said optical fiber and diffract them in different angular directions as a function of the wavelength of said optical signals, said grating comprising a plurality of steps of predetermined width and height where said height is such that said grating is substantially blazed simultaneously at at least two wavelengths which divide substantially evenly into said step height and are separated in wavelength by less than octave; and
wavelength selective means for receiving said blazed wavelengths and directing them along separate optical paths in accordance with their wavelength.

27. The multistage device of claim 26 wherein said wavelength selective means comprises a bulk echelon grating.

28. The device of claim 26 wherein said include 1.3 and 1.55 micrometers.

* * * * *